United States Patent
Raza et al.

(10) Patent No.: US 9,882,713 B1
(45) Date of Patent: Jan. 30, 2018

(54) METHOD AND SYSTEM FOR KEY GENERATION, DISTRIBUTION AND MANAGEMENT

(71) Applicants: Syed Khalid Raza, Fremont, CA (US); Praveen Raju Kariyanahalli, San Ramon, CA (US); Rameshbabu Prabagaran, Los Gatos, CA (US); Amir Khan, San Jose, CA (US)

(72) Inventors: Syed Khalid Raza, Fremont, CA (US); Praveen Raju Kariyanahalli, San Ramon, CA (US); Rameshbabu Prabagaran, Los Gatos, CA (US); Amir Khan, San Jose, CA (US)

(73) Assignee: VIPTELA INC., San Jose, CA (US)

( * ) Notice: Subject to any disclaimer, the term of this patent is extended or adjusted under 35 U.S.C. 154(b) by 165 days.

(21) Appl. No.: 13/754,866

(22) Filed: Jan. 30, 2013

(51) Int. Cl.
*H04L 9/08* (2006.01)

(52) U.S. Cl.
CPC .................................. *H04L 9/0802* (2013.01)

(58) Field of Classification Search
CPC ........ H04L 9/08; H04L 63/062; H04L 63/065
USPC .................................................. 380/278, 279
See application file for complete search history.

(56) References Cited

U.S. PATENT DOCUMENTS

| | | | | |
|---|---|---|---|---|
| 8,879,739 B2 * | 11/2014 | Bieber | ........................... | 380/283 |
| 8,959,333 B2 * | 2/2015 | Falk et al. | ..................... | 713/154 |
| 9,659,170 B2 * | 5/2017 | Chapman, III | ......... | G06F 21/53 |
| 2004/0103205 A1 * | 5/2004 | Larson et al. | ................ | 709/229 |
| 2007/0118885 A1 * | 5/2007 | Elrod | ................... | H04L 63/0861 |
| | | | | 726/5 |
| 2007/0140110 A1 * | 6/2007 | Kaler | ............................ | 370/218 |
| 2008/0273704 A1 * | 11/2008 | Norrman et al. | ............. | 380/278 |
| 2009/0193253 A1 * | 7/2009 | Falk et al. | ..................... | 713/171 |
| 2009/0216910 A1 * | 8/2009 | Duchesneau | ................. | 709/250 |
| 2010/0014677 A1 * | 1/2010 | Sato | ...................... | H04L 9/0833 |
| | | | | 380/279 |
| 2010/0169563 A1 * | 7/2010 | Horner | ................... | G11C 15/00 |
| | | | | 711/108 |
| 2013/0051559 A1 * | 2/2013 | Baba | ........................... | 380/279 |
| 2013/0251154 A1 * | 9/2013 | Tanizawa et al. | ............ | 380/278 |
| 2013/0306276 A1 * | 11/2013 | Duchesneau | ............ | 165/104.21 |
| 2013/0335582 A1 * | 12/2013 | Itasaki et al. | .............. | 348/207.1 |
| 2014/0153457 A1 * | 6/2014 | Liu | ............................... | 370/311 |
| 2014/0153572 A1 * | 6/2014 | Hampel et al. | ............... | 370/392 |

(Continued)

OTHER PUBLICATIONS

"FAQ: Vormetric Key Management—Key Agent for Microsoft SQL Server Transparent Data Encryption", Version 7.2, Jul. 2, 2012. Vormetric.com.*

(Continued)

*Primary Examiner* — Kambiz Zand
*Assistant Examiner* — Tongoc Tran
(74) *Attorney, Agent, or Firm* — Maschoff Brennan

(57) ABSTRACT

A method for securing communications for a given network topology is provided. The method comprises generating by a node N(i) of the network, security parameters for the node N(i); transmitting by the node N(i), said security parameters to a controller for the network; maintaining by the controller said security parameters for the node N(i); receiving by the controller a request from a node N(j) for the security parameters for the node N(i); retrieving by the controller the security parameters for the node N(i); and transmitting by the controller said security parameters to the node N(j).

19 Claims, 7 Drawing Sheets

(56) References Cited

U.S. PATENT DOCUMENTS

2014/0189363 A1* 7/2014 Thomas .............. G06F 21/6218
                                                        713/189
2014/0223520 A1* 8/2014 Gafni ................................ 726/4
2014/0294018 A1* 10/2014 Sung et al. ................... 370/474
2014/0331050 A1* 11/2014 Armstrong et al. .......... 713/171
2014/0380039 A1* 12/2014 Larson et al. ................ 713/154

OTHER PUBLICATIONS

"FAQ: Vormetric Key Management Key Vault", Version 5.2, May 14, 2012, Vormetric.com.*

* cited by examiner

METHOD AND SYSTEM FOR KEY GENERATION, DISTRIBUTION AND MANAGEMENT

FIELD

Embodiments of the present invention relate to methods and systems for key generation, distribution, and management.

BACKGROUND

Networked applications, such as voice and video, are accelerating the need for instantaneous, branch-interconnected, and Quality of Service-(QoS) enabled Wide Area Networks (WANs). The distributed nature of these applications results in increased demands for scale. Moreover, as network security risks increase and regulatory compliance becomes essential there is a need for transport security and data privacy.

GDOI refers to the Internet Security Association Key Management Protocol (ISAKMP) Domain of Interpretation (DOI) for group key management. In a group management model, the GDOI protocol operates between a group member and a group controller or key server (GCKS), which establishes security associations (SAs) among authorized group members.

Each group member registers with the key server to get the IPsec SA or SAs that are necessary to communicate with the group. The group member provides the group ID to the key server to get the respective policy and keys for this group. These keys are refreshed periodically, and before the current IPsec SAs expire.

The responsibilities of the key server include maintaining the policy and creating and maintaining the keys for the group. When a group member registers, the key server downloads this policy and the keys to the group member. The key server also rekeys the group before existing keys expire.

With GDOI, the key server has to maintain timers to control when to invalidate an old key after rekeying has occurred. Moreover, if one key is compromised then the security of communications to all group members sharing said key is also compromised.

SUMMARY

According to a first aspect of the invention, there is provided a method for key generation, distribution, and management.

The method may comprise establishing a secure control channel between each node of a network topology and a central controller. The control channel may be established using a suitable protocol such as SSL and is persistent over time.

The method may comprise generating security parameters by each node of a network topology; and publishing said security parameters to the central controller using its control channel with the controller.

The encryption parameters may comprise at least an encryption key and a decryption key for a node. The encryption and decryption keys are specific to a networking device operative at the node and are unique to said device.

The method may comprise providing the security parameters for a given node in response to a request therefor by a requesting node.

The method may comprise encrypting data towards the given node by the requesting node using an encryption key of the security parameters of the given node.

The method may comprise periodically generating new keys at each node and sending a rekey message to the controller using the control channel established between the node and the controller, the rekey message comprising the new keys.

The method may comprise selectively invalidating old keys by each node and communicating said invalidation to the controller.

Other aspects of the invention will be apparent from the detailed description below.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention disclose methods and systems for key generation, distribution, and management. Advantageously, said methods and systems enable encryption of multicast and unicast packets over a public WAN such as the Internet.

Figure 1:
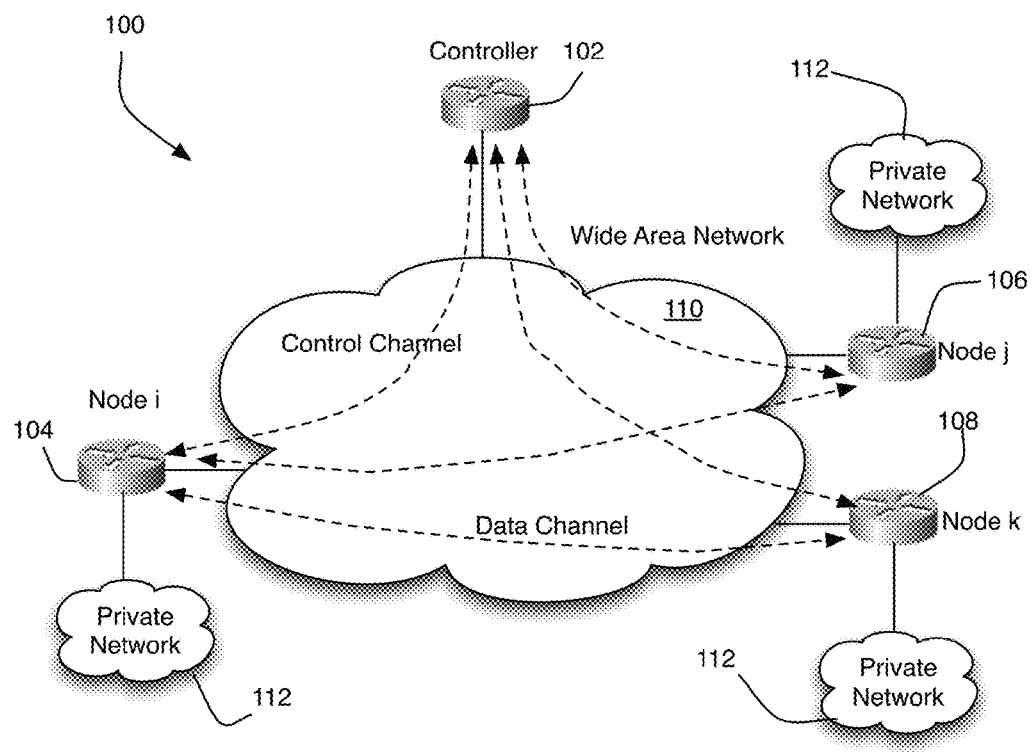
FIG. 1 shows an exemplary network topology in accordance with one embodiment of the invention.

FIG. 1 shows a network topology 100 with a controller 102 and plurality of nodes N, of which only nodes 104, 106, and 108 have been shown. The devices may be communicatively coupled via an intermediate WAN 110.

Each node of the topology 100 may comprise a router and may define an access point to a private network 112.

It is to be noted that the nodes of the topology 100 may be located at different geographic locations, branches, customer premises, or on different circuits, carrier networks, etc.

Figure 2:
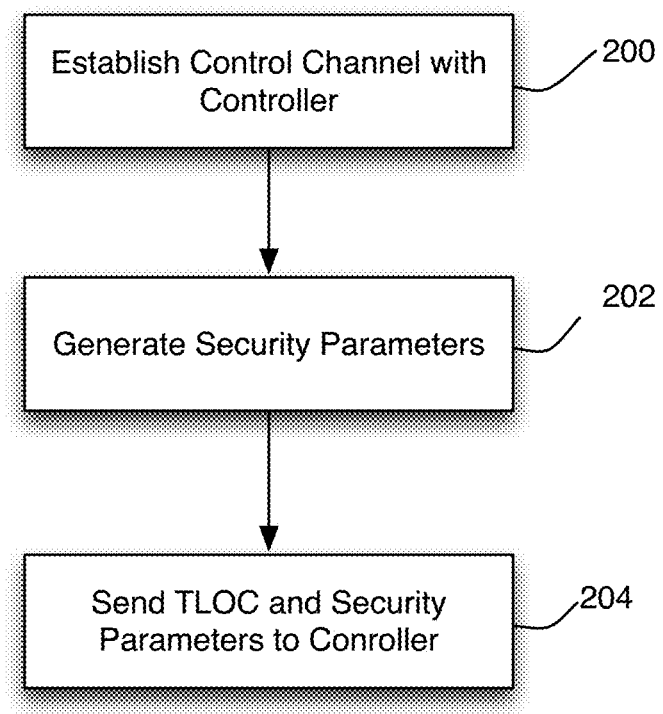
FIG. 2 shows processing blocks for a Key Generation and Publishing method in accordance with one embodiment of the invention.

In accordance with the methods of the present invention, each node N(i) of the plurality of nodes N executes a Key Generation and Publishing method. Said Key Generation and Publishing method is shown in the flow chart of FIG. 2, in accordance with one embodiment and comprises the following processing blocks:

Block 200: where the node N(i) establishes a Control Channel with the controller 102. In one embodiment the Control Channel may be established using a protocol such as SSL. One advantage of using SSL to establish the control channel 112 is that SSL is a relatively lightweight protocol compared to say IKE. Once established the Control Channel is persistent over time or always available;

Block 202: where the node N(i) generates Security Parameters. In one embodiment, the Security Parameters may include an encryption key and a decryption key. In one embodiment, the Security Parameters may comprise predefined Security Profiles that the node N(i) may support. Each Security Profile may include a Security Association. Examples of Security Profiles include:

```
Gold security-profile : {
    Encryption: AES
        Digest      : SHA2
        ::::
}
Silver security-profile : {
    Encryption: 3 Key 3DES
        Digest      : SHA1
        ::::
}
Bronze security-profile : {
    Encryption: 2 Key 3DES
        Digest      : MD5
        ::::
}
```

In one embodiment, node N(i) generates a IPSEC SA based on the Security Profiles it supports.

Typically each node N(i) may comprise a router. The encryption and decryption keys may be uniquely generated by the router for the router. That is to say the encryption and decryption keys are established per device in the topology 100; and Block 204: where the node N(i) sends its transport location address (TLOC), the Security Parameters, information on its connected routes or peers to the controller 102 via the Control Channel that exists between the two.

In accordance with one embodiment of the invention, the controller 102 may store the TLOC for the node N(i). Additionally, the controller 102 may create a security association for the node N(i) based on the received Security Parameters.

Figure 3:
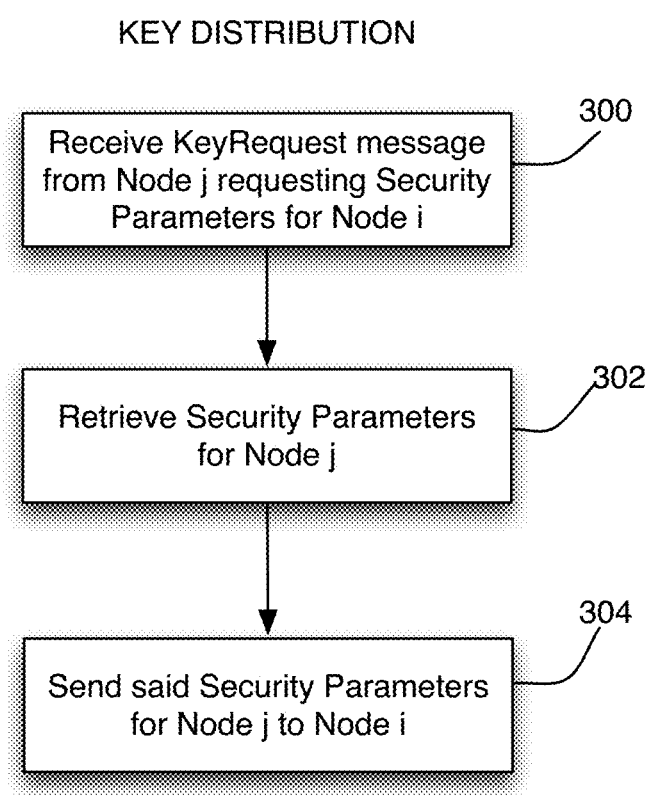
FIG. 3 shows processing blocks for a Key Distribution method in accordance with one embodiment of the invention.

In accordance with the methods of the present invention, the controller 102 performs a Key Distribution method. One embodiment of this method is shown in the flow chart of FIG. 3, where it will be seen that the method includes the following processing blocks:

Block 300: where the controller 102 receives a Key Request Message (KRM). The KRM may be from a node N(j) that is requesting Security Parameters for the node N(i);

Block 302: where responsive to the KRM, the controller retrieves the Security Parameters for the node N(i), e.g. based on its TLOC (Transport Location) address; and Block 304: where the controller 102 sends the retrieved Security Parameters to the node N(j).

All messages and data exchanged between the controller 102 and the node N(j) as part of the Key Distribution Method use the Control Channel that exists between the two.

Figure 4:
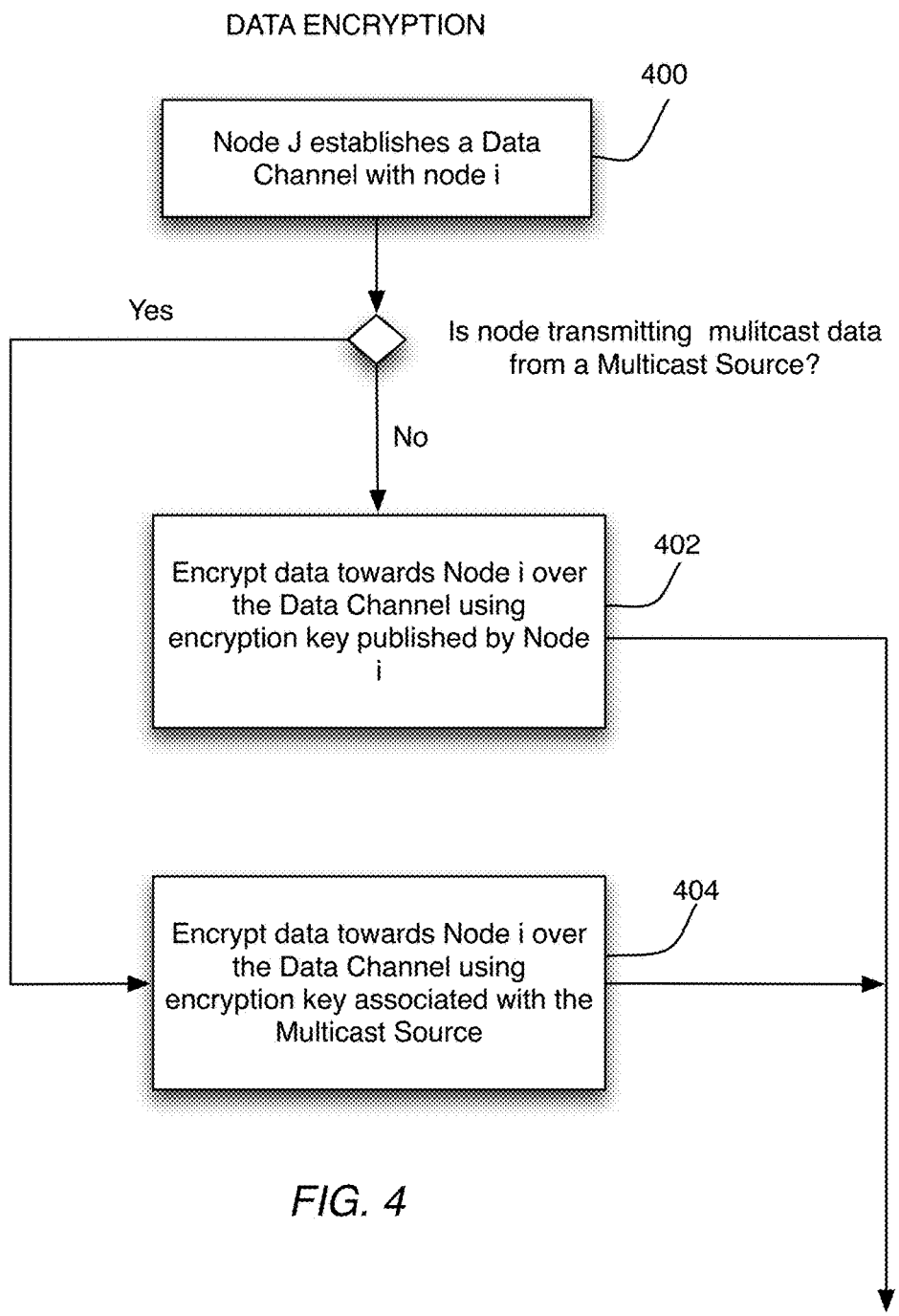
FIG. 4 shows processing blocks for a Data Encryption method in accordance with one embodiment of the invention.

At this point, the node N(j) knows the TLOC address of the node N(i) and the Security Parameters for the node N(i). Thus, the node N(j) may use this information to encrypt data towards the node N(i) as is shown in the flowchart of FIG. 4, where it will be seen that the method includes the following processing blocks:

Block 400: where the node N(j) establishes a Data Channel with the node N(i). Any suitable protocol may be used for the Data Channel. In one embodiment of the invention IPsec may be used as a protocol for the Data Channel. By virtue of the Data Channel, the nodes N(j) and N(i) will become peer-to-peer session partners;

Block 402 where data towards the node N(i) is encrypted using the encryption key associated with the node N(i) as obtained from the controller 102 in the manner already described. For example if the node N(i) supports the Gold Security Profile, then the encryption algorithms as per the Gold Security Profile is used to encrypt packets towards the node N(i). At the same time the node N(i) may be communicating with a device that supports a less secure Security Profile, say the Silver Security Profile. In that case packets towards this node will be encrypted using the encryption algorithms as per the Silver Security Profile. The block 402 is for unicast traffic only; and Block 404 where for multicast traffic, the data towards the node N(i) is encrypted using an encryption key associated with the multicast traffic. For example, the actual encryption key used in one embodiment may comprise an encryption key published on the controller 102 by a source for the multicast traffic.

Figure 5:
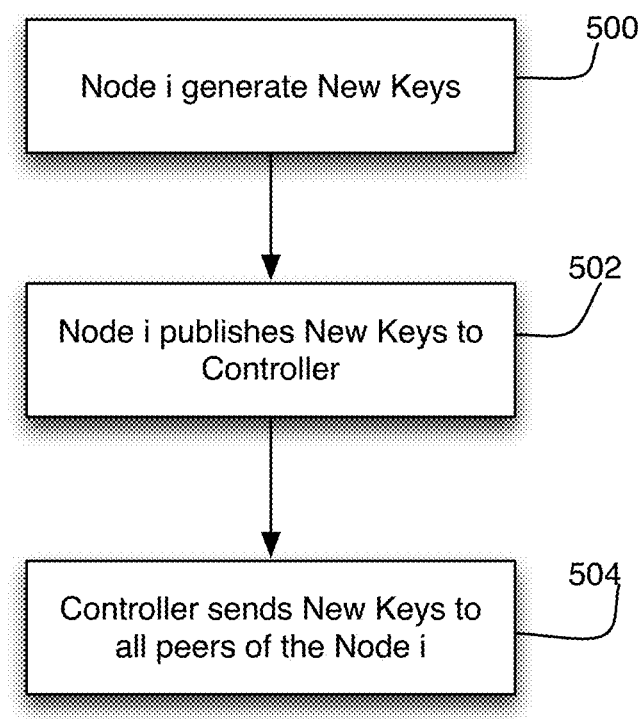
FIG. 5 shows processing blocks for a Rekey Generation and Distribution method in accordance with one embodiment of the invention.

In one embodiment, the invention discloses a Rekey Generation and Distribution method, which includes the following processing blocks as is shown in the flowchart of FIG. 5:

Block 500: where the node N(i) performs a rekeying operation to generate new keys. The generation of the new keys may be responsive to a rekeying trigger. As an example, a rekeying trigger may be time-based where new keys are generated at periodic intervals in accordance with a rekey timer maintained by the controller 102; and Block 502: where the node N(i) publishes the new keys to the controller 102 via the Control Channel that exists between the two; and Block 504: where the controller 102 sends the new keys to all peers or session partners of the node N(i).

Figure 6:
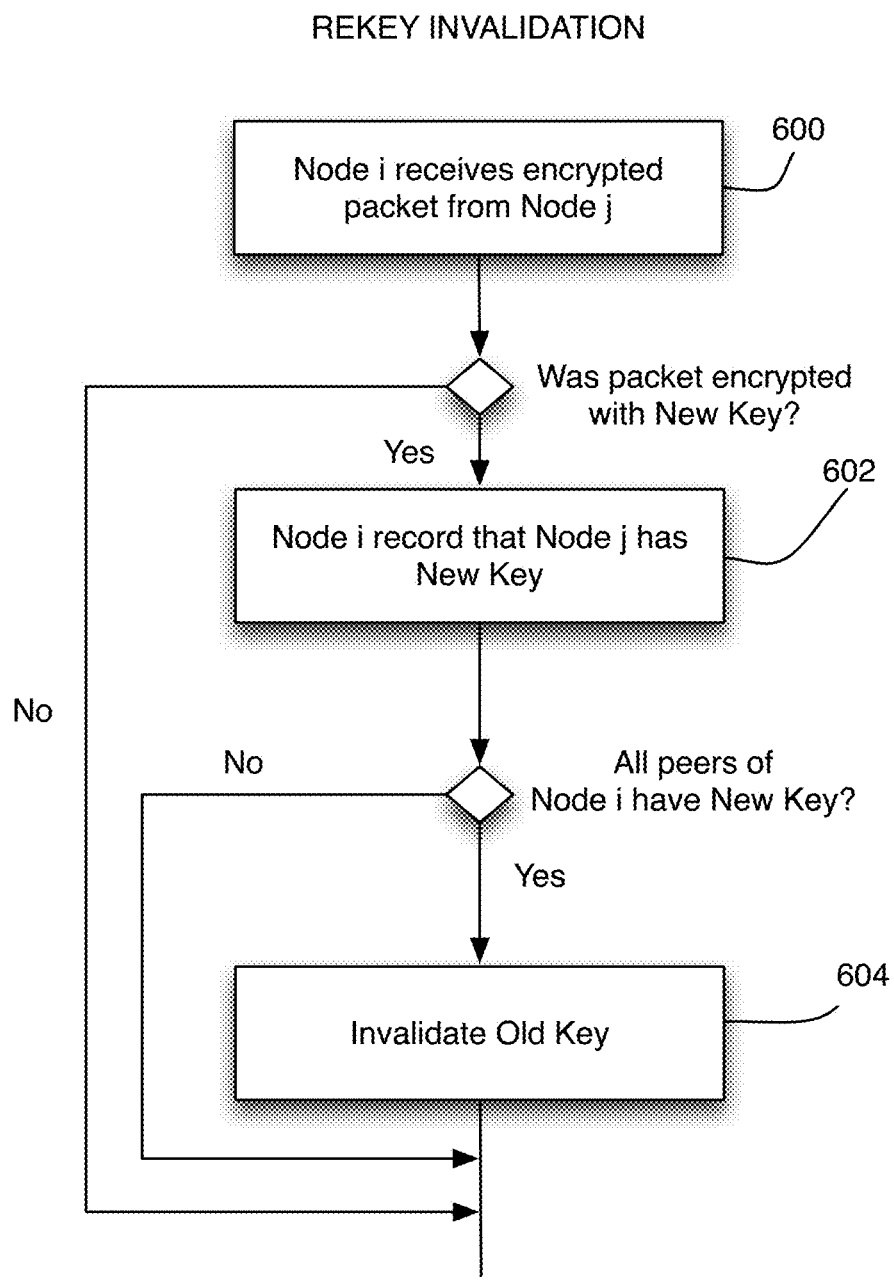
FIG. 6 shows processing blocks for a Rekey Invalidation method in accordance with one embodiment of the invention.

An important aspect of key management involves the invalidation of old keys after rekeying has occurred. In one embodiment key invalidation is a function of each node in the topology 100. FIG. 6 shows a flow chart for a Rekey Invalidation method for a node N(i), in accordance with one embodiment. Referring to FIG. 6, the Rekey Invalidation method comprises the following processing blocks:

Block 600: where the node N(i) receives an encrypted data packet from the node N(j);

Block 602: where if the encrypted packet was encrypted using a newly issued key generated through rekeying, then the node N(i) records that the node N(j) is in possession of the new key. For example, in one embodiment, the node N(j) may maintain and/or update a data structure that tracks whether the Node(j) has the new key; and Block 604: where if all the peers of the node N(i) has the new key as determined by the information recorded for each peer at block 602, then the node N(i) invalidates the old key that was in use prior to the generation of the new key.

Advantageously, in accordance with the above-described Rekey Invalidation method there is no need to maintain a timer to control how long to keep an old key active before it can be invalidated. Moreover, because an old key in only invalidated when it is no longer in use by any peer data loss through data encryption by an invalidated key is no longer a problem.

Setting up peer-to-peer secure connections within a network comprising N nodes generally would require n choose 2 or nC2 i.e. (n*(n−1)/2) connections. This is a large number of connections, on the order of n squared to manage and the problem is further compounded by the need to maintain nC2 data plane connections and nc2 control plane connections. Advantageously, in accordance with the methods disclosed herein, only N control plane connections are required. Moreover, because encryption keys are issued per device there are only N encryption keys required.

In one embodiment, the controller 102 may maintain a old key timer to control how long to keep an old key active after the generation of a new key that supersedes the old key. The new key is pushed to each node N(i) that is a peer of a node N(j) that generated the new key, pursuant to a rekey trigger. The old key timer is pushed to the node N(j) that issued the new key. The node N(j) will decrypt packets encrypted with the old key for as long as the old key timer is unexpired. After the old key timer expires, the node N(j) will no longer decrypt packets encrypted with the old key.

Advantageously, the techniques of key generation, distribution, and management disclosed herein facilitate the creating of very large scale secure networks without the need for private carrier circuits. Thus, a large network such as the Internet may be used a secure network without any private carrier circuits.

Figure 7:
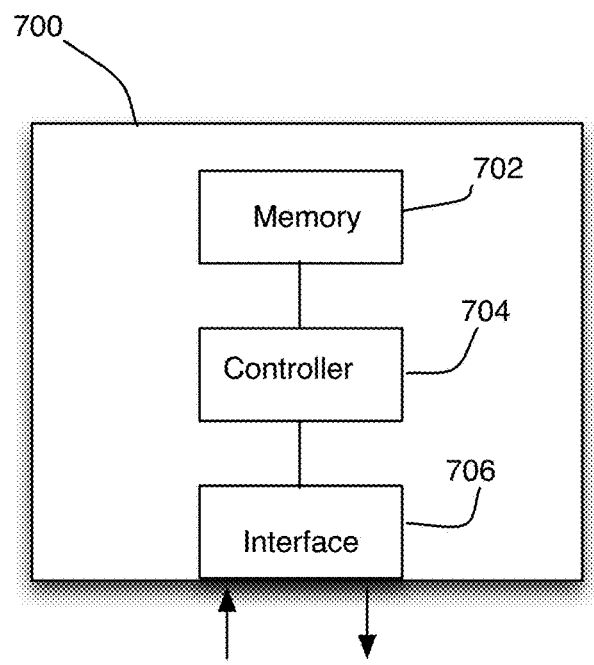
FIG. 7 shows as high-level block diagram for an exemplary node, in accordance with one embodiment of the invention.

An exemplary construction of a node 700 of the network topology 100 will now be described by reference to FIG. 7, which shows an exemplary client node 700 according to an embodiment of the present invention. The node 700 comprises a memory 702, a control block 704 and an interface 706. The memory 702, which stores encryption keys, may be a volatile memory, or may alternatively be a non-volatile memory, or persistent memory, that can be electrically erased and reprogrammed and that may be implemented, for example, as a flash memory or as a data storage module. The memory 702 could further represent a plurality of memory modules comprising volatile and/or non-volatile modules. The controller 704 may be any commercially available, general-purpose processor, or may be specifically designed for operation in the node 700. The controller 704 may be operable to execute processes related to the present invention described above in addition to numerous other processes. The controller 704 may also comprise an array of processors and/or controllers. The interface 706 communicates with other nodes of network topology 100. It may be implemented as one single device or as distinct devices for receiving and sending signaling, messages and data. The node 700 may comprise, in various embodiments, various types of devices such as, for example, a satellite TV decoder, a cable TV decoder, a personal computer, a gaming device, a router, and the like. Therefore the interface 706 may comprise a plurality of devices for connecting on links of different types. Only one generic interface 706 is illustrated for ease of presentation of the present invention.

Figure 8:
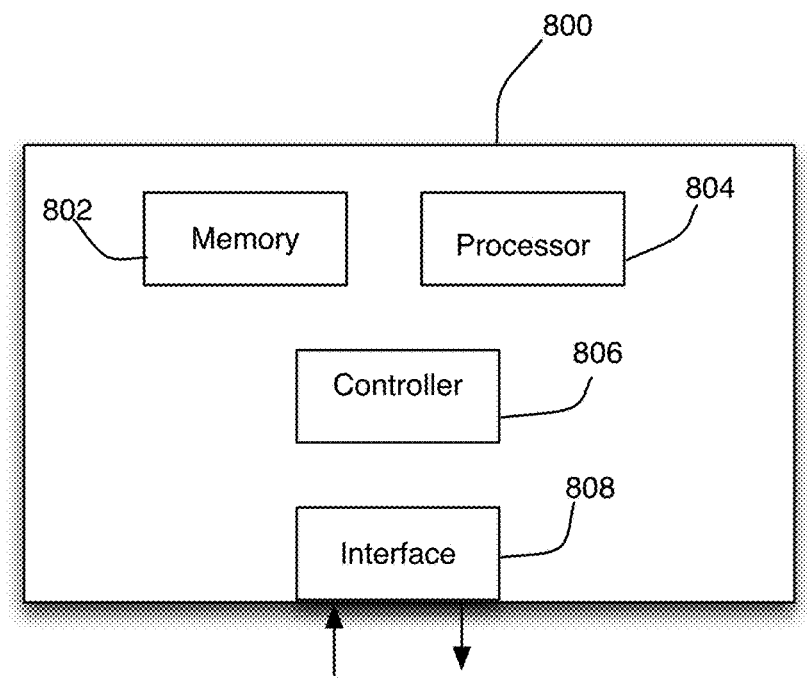
FIG. 8 shows as high-level block diagram for an exemplary controller, in accordance with one embodiment of the invention.

An exemplary construction of a controller 102 will now be described by reference to FIG. 8, which shows exemplary controller hardware/system 800 according to an aspect of the present invention. The hardware 800 comprises a memory 802, a processor 804, a control block 806, and an interface 740. The memory 802, which stores encryption keys, may be a volatile memory, or may alternatively be a non-volatile memory, or persistent memory, that can be electrically erased and reprogrammed and that may be implemented, for example, as a flash memory or as a data storage module. The memory 802 could further represent a plurality of memory modules comprising volatile and/or non-volatile modules. The processor 804 as well as the controller 806 may be any commercially available, general-purpose processor, or may be specifically designed for operation in the system 800. One or both of the processor 804 and the controller 806 may also comprise arrays of processors and/or controllers. These two elements 804 and 806 are shown as distinct components of FIG. 8 in order to better highlight their respective features. However, those skilled in the art will readily recognize that the processor 804 and the controller 806 may be combined in a generic processing element or an appropriately designed or programmed processing element, capable of performing features of both the processor 804 and the controller 806. The processor 804 and the controller 808 may both be operable to execute processes related to the present invention as described above in addition to numerous other processes. The interface 808 communicates with other nodes of the network topology 100. It may be implemented as one single device or as distinct devices for receiving and sending signaling, messages and data. The hardware 800 may comprise, in various embodiments, various types of devices such as, for example, a satellite TV transmitter, a cable TV transmitter, a specially programmed internet protocol server, routers, servers, and the like. The hardware 800 may communicate with nodes either directly or through physical intermediate nodes. Therefore the interface 808 may comprise a plurality of devices for connecting on links of different types. Only one generic interface 808 is illustrated for ease of presentation of the present invention.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A method for securing communications for a network, the method comprising:

generating, by a node N(i) of the network, security parameters for the node N(i);

establishing, by the node N(i), a secure communications channel with a controller for the network, wherein the controller is a distinct entity from the node N(i);

transmitting, by the node N(i), the security parameters to the controller for the network;

maintaining, by the controller, the security parameters for the node N(i);

receiving, by the controller, a request from a node N(j) of the network for the security parameters for the node N(i);

retrieving, by the controller, the security parameters for the node N(i);

transmitting, by the controller, the security parameters to the node N(j); and selectively invalidating, by the node N(i), an old encryption key when the old encryption key is no longer in use by all current peers of the node N(i) and all the current peers have transitioned to a new encryption key, wherein the security parameters for the node N(i) include at least one of the old encryption key and the new encryption key, and the old encryption key and the new encryption key are unique for the node N(i) with respect to every other device in the network.

2. The method of claim 1, further comprising:

receiving, by the controller, a rekey message from the node N(i), the rekey message comprising the new encryption key for the node N(i);

identifying all the current peers of the node N(i); and pushing the new encryption key to each current peer.

3. A method for key distribution by a controller, the method comprising:

maintaining a secure control channel with each node N(i) of a network;

receiving, from the each node N(i) of the network, security parameters for the node N(i) generated by the node N(i) and transmitted via the secure control channel;

storing the security parameters received for the each node N(i);

receiving, from a node N(j) of the network, a request for the security parameters associated with a particular node N(i), wherein the request is received via the secure control channel;

responsive to receiving the request, sending the security parameters associated with the particular node N(i) to the node N(j) via the secure control channel; and instructing the each node N(i) of the network to selectively invalidate an old encryption key when the old encryption key is no longer in use by all current peers of the node N(i) and all the current peers have transitioned to a new encryption key, wherein the security parameters for the node N(i) include at least one of the old encryption key and the new encryption key, and the old encryption key and the new encryption key are unique for the node N(i) with respect to every other device in the network.

4. The method of claim 3, further comprising:

periodically receiving a rekey message from the each node N(i), the rekey message comprising the new key generated by the node N(i);

storing the new key as associated with the node N(i);

determining all the current peers for the node N(i); and pushing the new key to each node that is a current peer of the node N(i) via the secure control channel.

5. A controller, comprising:

a processor; and a memory coupled to the processor, the memory storing instructions which when executed perform a method for key distribution, comprising:

maintaining a secure control channel with each node N(i) of a network;

receiving, from the each node N(i) of the network, security parameters for the node N(i) generated by the node N(i) and transmitted via the secure control channel;

storing the security parameters received for the each node N(i);

receiving from a node N(j) of the network, a request for the security parameters associated with a particular node N(i), wherein the request is received via the secure control channel;

responsive to the request, sending the security parameters associated with the particular node N(i) to the node N(j) via the secure control channel; and instructing the each node N(i) of the network to selectively invalidate an old encryption key when the old encryption key is no longer in use by all current peers of the node N(i) and all the current peers have transitioned to a new encryption key, wherein the security parameters for the node N(i) include at least one of the old encryption key and the new encryption key, and the old encryption key and the new encryption key are unique for the node N(i) with respect to every other device in the network.

6. The controller of claim 5, wherein the method further comprises:

periodically receiving a rekey message from the each node N(i), the rekey message comprising the new key generated by the node N(i);

storing the new key as associated with the node N(i);

determining all the current peers for the node N(i); and pushing the new key to each node that is a current peer of the node N(i) via the secure control channel.

7. A method for network security comprising a plurality of nodes N(i), the method comprising:

generating, at each node N(i) of the network, security parameters for the node N(i), the security parameters comprising at least one encryption key;

sending, by the node N(i), the security parameters to a controller via a secure control channel maintained with the controller;

establishing, by the node N(i), communications with a node N(j) comprising:

requesting security parameters associated with the node N(j) from the controller via the secure control channel;

receiving the security parameters including an encryption key generated by the node N(j); and establishing a peer-to-peer session with the node N(j); and selectively invalidating, by the node N(i), an old encryption key when the old encryption key is no longer in use by all current peers of the node N(i) and all the current peers have transitioned to a new encryption key, wherein the security parameters for the node N(i) include at least one of the old encryption key and the new encryption key, and the old encryption key and the new encryption key are unique for the node N(i) with respect to every other device in the network.

8. The method of claim 7, wherein establishing communications with the node N(j) further comprises encrypting data towards the node N(j) using the encryption key generated by the node N(j), in the case of unicast traffic.

9. The method of claim 7, wherein establishing communications with the node N(j) further comprises encrypting data towards the node N(j) using an encryption key generated by a multicast source node, in the case of multicast traffic.

10. The method of claim 9, wherein the encryption key for the multicast source node is received from the controller via the secure control channel.

11. The method of claim 7, further comprising periodically generating the new encryption key at the node N(i) and sending the new encryption key to the controller via the secure control channel.

12. The method of claim 7, wherein the selective invalidation is based on a timer.

13. A router for routing communications within a network, the router comprising:
 a processor; and
 a memory coupled to the processor, the memory storing instructions which when executed cause the router to perform a method, comprising:
 generating security parameters for the router, the security parameters comprising at least one encryption key;
 sending the security parameters to a controller via a secure control channel maintained with the controller, wherein the controller is an entity in the network distinct from the router;
 establishing communications with a router N(j) comprising:
  requesting security parameters associated with the router N(j) from the controller via the secure control channel;
  receiving the security parameters including an encryption key generated by the router N(j); and
  establishing a peer-to-peer session with the router N(j); and
 selectively invalidating, by the node N(i), an old encryption key when the old encryption key is no longer in use by all current peers of the node N(i) and all the current peers have transitioned to a new encryption key, wherein the security parameters for the node N(i) include at least one of the old encryption key and the new encryption key, and the old encryption key and the new encryption key are unique for the node N(i) with respect to every other device in the network.

14. The router of claim 13, wherein establishing communications with the router N(j) further comprises encrypting data towards the router N(j) using the encryption key generated by the router N(j), in the case of unicast traffic.

15. The router of claim 13, wherein establishing communications with the router N(j) further comprises encrypting data towards the router N(j) using an encryption key generated by a multicast source node, in the case of multicast traffic.

16. The router of claim 13, wherein the method further comprises periodically generating the new encryption key and sending the new encryption key to the controller via the secure control channel.

17. The method of claim 1, wherein generating, by the node N(i), the security parameters comprises generating at least one encryption key and at least one decryption key for the node N(i).

18. The method of claim 17, further comprising encrypting data towards the node N(i), by the node N(j), using the at least one encryption key comprised in the security parameters for the node N(i).

19. The method of claim 17, further comprising decrypting data towards the node N(j), by the node N(j), using the at least one decryption key comprised in the security parameters for the node N(i).

* * * * *

UNITED STATES PATENT AND TRADEMARK OFFICE
CERTIFICATE OF CORRECTION

PATENT NO. : 9,882,713 B1
APPLICATION NO. : 13/754866
DATED : January 30, 2018
INVENTOR(S) : Raza et al.

It is certified that error appears in the above-identified patent and that said Letters Patent is hereby corrected as shown below:

In the Specification

In Column 1, Line 15, delete "Service-(QoS)" and insert -- Service (QoS) --, therefor.

In Column 1, Line 21, delete "Association Key" and insert -- Association and Key --, therefor.

In Column 2, Line 34, delete "shows as" and insert -- shows a --, therefor.

In Column 2, Line 37, delete "shows as" and insert -- shows a --, therefor.

In Column 3, Lines 33-34, delete "control channel 112" and insert -- control channel --, therefor.

In Column 3, Line 67, delete "address (TLOC)," and insert -- (TLOC) address, --, therefor.

In Column 4, Line 37, delete "Block 402" and insert -- Block 402: --, therefor.

In Column 4, Line 49, delete "Block 404" and insert -- Block 404: --, therefor.

In Column 5, Line 17, delete "Node(j)" and insert -- node N(j) --, therefor.

In Column 5, Line 39, delete "a old" and insert -- an old --, therefor.

In Column 6, Line 41, delete "controller 808" and insert -- controller 806 --, therefor.

In the Claims

In Column 7, Line 18, in Claim 1, delete "key" and insert -- key, --, therefor.

In Column 7, Line 31, in Claim 2, delete "to each current peer." and insert -- to all the current peers. --, therefor.

Signed and Sealed this
Tenth Day of April, 2018

Andrei Iancu
*Director of the United States Patent and Trademark Office*

CERTIFICATE OF CORRECTION (continued)
U.S. Pat. No. 9,882,713 B1

In Column 8, Line 56, in Claim 7, delete "key" and insert -- key, --, therefor.

In Column 10, Line 2, in Claim 13, delete "key" and insert -- key, --, therefor.

In Column 10, Line 19, in Claim 16, delete "method" and insert -- operations --, therefor.

In Column 10, Line 20, in Claim 16, delete "comprises" and insert -- comprise --, therefor.

In Column 10, Line 32, in Claim 19, delete "N(j), using" and insert -- N(i), using --, therefor.